United States Patent
Moore et al.

(10) Patent No.: US 12,056,398 B2
(45) Date of Patent: Aug. 6, 2024

(54) ELECTRONIC DATA FILE ACCESS MANAGEMENT IN A DISTRIBUTED COMPUTER SYSTEM

(71) Applicant: HEWLETT PACKARD ENTERPRISE DEVELOPMENT LP, Houston, TX (US)

(72) Inventors: Michael Todd Moore, Salado, TX (US); Ashwin Reghunandanan, Karnataka (IN); Patrick McCarthy, Rochester, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 32 days.

(21) Appl. No.: 18/153,084

(22) Filed: Jan. 11, 2023

(65) Prior Publication Data
US 2024/0231688 A1    Jul. 11, 2024

(51) Int. Cl.
*G06F 3/06*    (2006.01)
*G06F 16/176*    (2019.01)
*G06F 16/182*    (2019.01)

(52) U.S. Cl.
CPC .......... *G06F 3/0659* (2013.01); *G06F 3/0611* (2013.01); *G06F 3/0643* (2013.01); *G06F 3/067* (2013.01); *G06F 16/1774* (2019.01); *G06F 16/182* (2019.01); *G06F 3/0656* (2013.01)

(58) Field of Classification Search
CPC .... G06F 3/0659; G06F 3/0611; G06F 3/0643; G06F 3/067; G06F 3/0656; G06F 16/182; G06F 16/1774
See application file for complete search history.

(56) References Cited

U.S. PATENT DOCUMENTS

| | | | |
|---|---|---|---|
| 9,940,346 B2* | 4/2018 | Attaluri | G06F 9/5038 |
| 2008/0120435 A1* | 5/2008 | Moreira | G06F 16/1774 710/1 |
| 2017/0039203 A1* | 2/2017 | Xu | G06F 3/0685 |

OTHER PUBLICATIONS

Congiu, Giuseppe, et al. "Improving collective I/O performance using non-volatile memory devices." 2016 IEEE International Conference on Cluster Computing (CLUSTER). IEEE, 2016. (Year: 2016).*

(Continued)

*Primary Examiner* — William E. Baughman
(74) *Attorney, Agent, or Firm* — Jones Robb PLLC

(57) ABSTRACT

An electronic data file management system may comprise storage nodes containing memory devices coupled through a network to compute nodes configured to request group access to a file on the storage nodes, the request being made by at least two processes running on the compute nodes. At least one of the compute nodes is configured to determine the type of a memory device that includes the file, cause the plurality of compute nodes to collectively access the file in a first access mode, applying a write lock mechanism and disabling a collective buffering mechanism to each of the different ones of the compute nodes if the memory device is a first type, and access the file in a second access mode, applying the write lock mechanism and enabling a collective buffering mechanism to each of the different ones of the compute nodes, if the memory device is a second type.

20 Claims, 10 Drawing Sheets

(56) References Cited

OTHER PUBLICATIONS

Bağbaba, Aye, and Xuan Wang. "Improving the mpi-io performance of applications with genetic algorithm based auto-tuning." 2021 IEEE International Parallel and Distributed Processing Symposium Workshops (IPDPSW). IEEE, 2021. (Year: 2021).*

Gropp, W., "Lecture 32: Introduction to MPI I/O," University of Illinois Urbana-Champaign, Apr. 22, 2015, pp. 32.

Moore, M. et al., "Lustre Lockahead: Early Experience and Performance Using Optimized Locking," Jan. 10, 2018, pp. 1-10.

* cited by examiner

ELECTRONIC DATA FILE ACCESS MANAGEMENT IN A DISTRIBUTED COMPUTER SYSTEM

INTRODUCTION

Computing systems that utilize multi-node parallel processing require communication protocols in order to operate. For example, computing systems may employ a protocol, such as message passing interface (MPI) in order to manage the operations of the parallel processes being executed on the compute nodes as well as transfer information between the parallel processes. Many of these computing systems also include storage nodes that are connected to the compute nodes that are configured for storage using a distributed file storage system. In order to manage access to the files on the storage nodes by the compute nodes, the compute nodes require additional communication protocols that augment the file management system found in operating systems used in the compute nodes. For example, MPI has been updated to include input/output messaging protocol and is referred to as Message Passing Interface—Input/Output (MPI-IO). MPI-IO includes two elements or functions that augment the standard file system control present in an operating system in order to perform the read and write access more efficiently.

Most storage nodes utilize traditional mass storage memory devices, such as magnetic hard disk drives and optical disk drives. Recent technology advances have made available new mass storage memory devices, such as solid state drives or persistent memory, which can access data within memory much faster than the traditional mass storage memory devices. Further, external access to the memory on these new mass storage memory devices is faster as a result of development of high speed interface protocols, such as non-volatile memory express (NVMe).

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
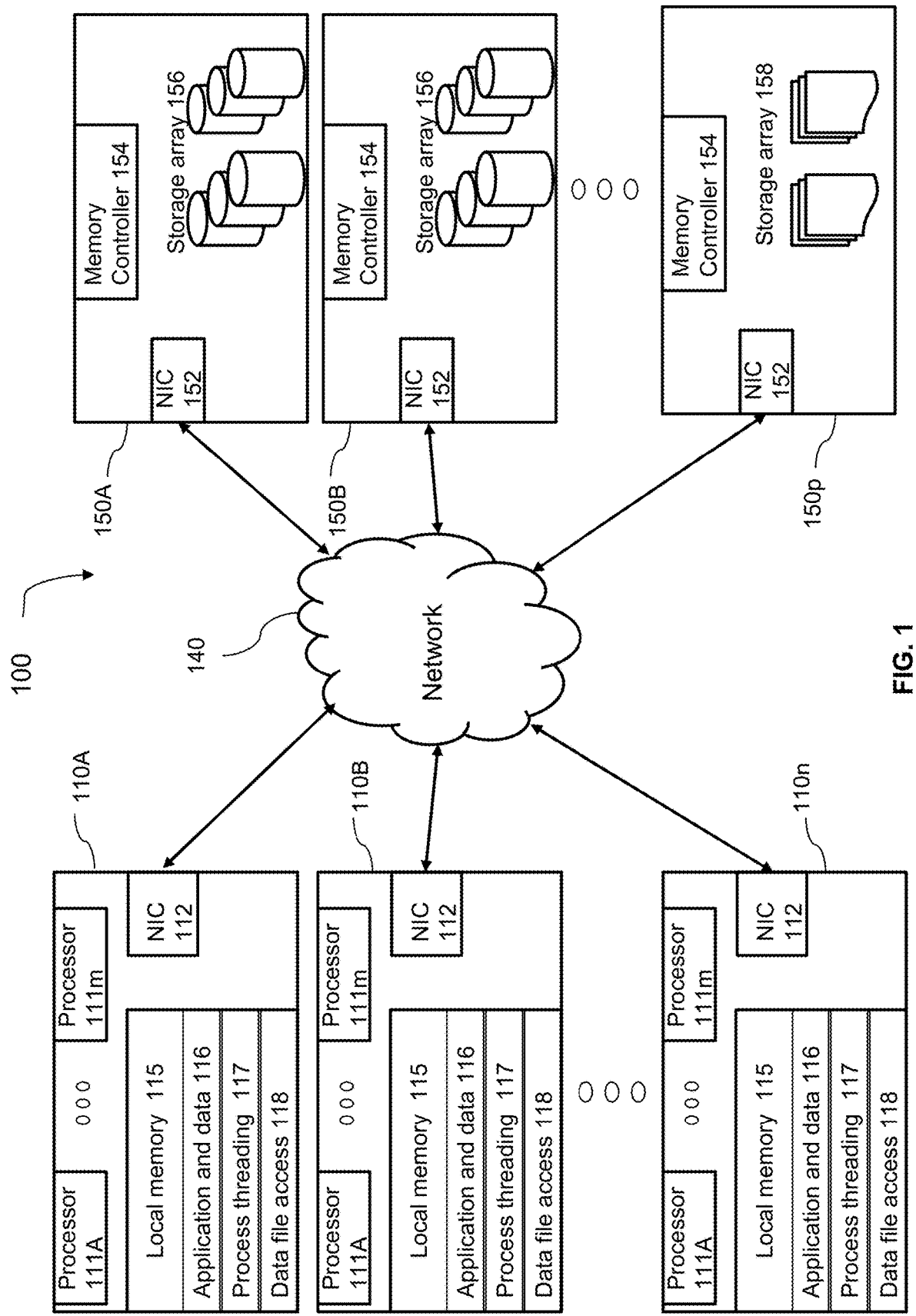
FIG. 1 is a block diagram illustrating an example distributed computer system.

Modern computer systems often include a plurality of compute nodes running a plurality of processes connected to a plurality of shared storage nodes through a network. More specifically, in some systems, such as high-performance compute (HPC) systems, many compute nodes and processes may be tightly coupled together to work jointly, for example as a cluster or distributed computing system, on processing a same job, with each process taking on different parts of the job. In some cases, a number of processes in the compute nodes may require access to the same file in a shared storage target within the storage nodes at the same time. This situation, referred to as group access, is not a situation that is efficiently handled using a standard file management system as part of an operating system included on the compute nodes. Instead, the management of group access to the storage nodes is carried out by a data passing protocol, such as MPI-IO.

MPI-IO is structured to assure that access to a file in the storage nodes requested by multiple compute nodes does not result in data storage overlap in the storage resources. Certain file systems associated with MPI-IO include a group lock mechanism and a collective buffering mechanism. The group lock mechanism informs the standard file management system to disable its normal locking mechanism and to allow processes using the group lock mechanism to be responsible for ensuring consistency in the data storage. The normal locking mechanism of the file management system generally prevents more than one process from writing to a file at a time to avoid inconsistent or overlapping writes, but with the normal locking mechanism disabled (due to the group lock mechanism) the multiple processes may concurrently write to the file. The collective buffering mechanism operates in two stages, the first stage involves assigning a subset of the processes requesting access to the file as aggregators. The aggregators first collect all of the data from the processes requesting access to the file. The aggregators then write the data to file based on the group lock conditions for each aggregator. In this manner, the number of processes that write to the remote storage during a group write is reduced, since a subset (the aggregators), rather than all, of the processes write data for any particular group write call. For example, if there are 20 processes and they are each going to write a 10 kilobyte (KB) chunk of data, then a subset of these processes, let's say four for example, will act as aggregators and collect the 10 KB chunks of data from the other processes, and then each aggregator will write a 50 KB chunk of data (comprising their data and the data collected from four other processes) to the remote storage.

This two-step process in collective buffering has worked well with more traditional mass storage memory devices, such as magnetic hard disk drives and optical disk drives. However, with the advent of more high-speed storage targets, such as solid-state drives or persistent memory, and the development of high-speed interface protocols, such as NVMe, the two-stage collective buffering mechanism has become a performance bottleneck due to its added processing overhead carried out within the compute nodes. Until now, in systems utilizing or based on MPI-IO, when group lock is used this also automatically causes collective buffering to be used. Until now, no message passing protocol has been capable of adapting to, and taking advantage of, high speed storage targets and high-speed interface protocols.

To address these challenges associated with group access to high-speed storage targets, examples disclosed herein introduce a new mechanism or mode for accessing a data file within the data passing protocol (e.g., MPI-IO) that retains the advantages of the group lock mechanism but without forcing traditional collective buffering to also be used. When a request for group access to a file is made by two or more processes in the compute nodes, the new access mode applies a write lock, similar to the group lock, to those processes. The new access mode further allows each of the processes to access the file based on the write lock conditions for the processes. In other words, the new access mode involves the use of a group lock or write lock mechanism while disabling the collective buffering mechanism described above. In addition, the use of the new access mode can be controlled based on a determination of a type of memory device being accessed for the storage target. More particularly, when the type of memory device is a fast storage target, such as described above, the new access mode may be used, whereas when the type of memory device is a traditional, slower storage target, the traditional access mode that utilizes a group lock and collective buffering may be used.

In some examples, access to a file using the new access mode by each of the processes requesting access may be carried out by allowing each of the processes to write data directly to the remote storage. In some examples, the processes may be treated by the data passing protocol (e.g., MPI-IO) as if they were all aggregators in the group write mechanism, aggregators of their own data and no other processes. This approach differs from the way aggregators are used in the traditional collective buffering operation in that (a) all processes will write to the storage, not just a subset, and (b) none of the processes are collecting data from the other processes for writing (they all just write their own data). In this manner the new access mode disables the intermediate step of collecting data from the processes prior to accessing the file. By disabling collective buffering, with its two-stage process as described herein, while still maintaining the group write lock, processing overhead is reduced within the compute nodes. As a result, the processes requesting access to a file in the compute nodes are better able to keep up with access capabilities of the higher speed memory devices.

Turning now to the figures, various devices, systems, and methods in accordance with aspects of the present disclosure will be described.

FIG. 1 is a block diagram illustrating an example computer system 100. It should be understood that FIG. 1 is not intended to illustrate specific implementations of the illustrated components, and that implementations of computer system 100 may have different numbers and arrangements of the illustrated components and may also include other elements that are not illustrated.

As shown in FIG. 1, computer system 100 is configured as a multi-node parallel processing computer system that includes a plurality of storage nodes configured in a parallel distributed file system. Computer system 100 includes multiple compute nodes 110 (e.g., compute nodes 110A-n) interconnected with at least one storage node 150 (e.g., storage nodes 150A-p) via a network 140. In FIG. 1, compute nodes 110A-n are illustrated as an example, but the computer system 100 may comprise any number of compute nodes 110 equal to or greater than two. Similarly, in FIG. 1 storage nodes 150A-p are illustrated as an example, but the computer system 100 may comprise any number of storage nodes 150. The network 140 may comprise one or more networking elements (not illustrated), such as switches, data communication cables, or other networking elements that route communications between the compute nodes 110 and the storage nodes 150. The network 140 may use any networking protocol or networking technology.

Each of compute nodes 110 includes one or more processors 111 (e.g., processors 111A-111m), a network interface card (NIC) 112, and local memory 115. Although in FIG. 1 the compute nodes 110A-n are illustrated as having processors 111A-111m, each compute node 110 does not necessarily have the same number of processors 111 and in some examples one or more compute nodes 110 may have a single processor. The local memory 115 includes storage for application software and associated data 116, a process threading system 117, and a data file access system 118.

Each storage node 150 includes a NIC 152, a memory controller 154, and a storage array 156 or a storage array 158. Storage array 158 comprises storage media that is of a first performance class, and storage array 156 comprises storage media that is of a second performance class, with the second performance class having slower performance (e.g., read or write times) than the first performance class. For example, the storage array 158 may comprise solid-state storage media such as flash-memory devices or non-volatile RAM (NVRAM) (e.g., flash memory, Memristor RAM, Resistive RAM, Phase Change Memory, 3D XPoint memory, etc.), while storage array 156 may comprise disk-based storage media. In FIG. 1, multiple storage nodes 150 having a mix of storage arrays 156 and 158 are illustrated. Specifically, in FIG. 1 storage nodes 150A and 150B include a storage array 156 while storage node 150p includes a storage array 158. However, in some examples the system 100 may comprise just storage nodes 150 having storage arrays 156 and in other examples system 100 may comprise just storage nodes 150 having storage arrays 158. Moreover, in some examples just a single storage node 150 is provided (which may have either a storage array 156 or a storage array 158). As explained in greater detail below, in some examples in which both storage arrays 156 and 158 are present in the system 100 (such as in FIG. 1), the system 100 may use different access modes when writing to a storage array 156 versus a storage array 158. These different access modes are described in greater detail below.

The processor(s) 111 in the compute nodes 110 may include any electronic processing circuitry capable of executing machine-readable instructions, such as a central processing unit (CPU), a system-on-chip (SoC), a microprocessor, a microcontroller device, a digital signal processor, etc.

The NICs 112 in the compute nodes 110 are configured to provide a wired or wireless connection between the compute nodes 110 and the network 140. Some examples of the physical interface include a wired Ethernet connection, a wireless 2.4 gigahertz (GHz) transceiver connection, and a 5 GHz transceiver connection. The NICs 112 also include software programs and instructions, as well as control commands, to allow the compute nodes to communicate to other elements, including other compute nodes as well as storage nodes 150 using a common communication protocol. Some examples of communication protocols include internet protocol (IP), cellular 3G, 4G, and 5G, the institute of electrical and electronic engineers (IEEE) standard 802.11 protocol, fibre channel (FC), infiniband, and HPE/Cray Slingshot.

The local memories 115 in the compute nodes 110 may include any machine-readable medium from which the processors can read program instructions and data, including volatile media such as random access memory (RAM) (e.g., dynamic RAM, static RAM, etc.) and/or persistent (non-volatile) media such as non-volatile RAM (NVRAM) (e.g., flash memory, Memristor RAM, Resistive RAM, Phase Change Memory, 3D XPoint memory, etc.).

The Application and data sections 116 of local memories 115 are configured for storage and retrieval of program instructions, along with any associated data, for a distributed software application that is run on the compute nodes 110. In some instances, the entire software application may be stored in the application and data section 116 of each of the local memories 115. In other instances, a portion may be stored in each of the local memories 115, such as the portion that runs in the associated storage node 110A-n. Examples of distributed software applications that may be stored in the application and data sections includes a cloud platform application for managing business commerce using Software-as-a-Service (SaaS), Platform-as-a-Service (PaaS), Infrastructure as a Service (IaaS), and so on.

The process threading systems 117 of local memories 115 are configured for storage and retrieval of program instructions for implementing and managing the parallel or distributed processing of the software application across the processors 111 in each of the compute nodes 110A-n. Many process threading systems 117 may utilize a set of instructions, as well as control commands, included as part of the MPI standard. The MPI instructions and control commands provide a communication mechanism between the processes that are managed by the process threading systems 117. Examples of process threading systems 117 include the portable operating system interface (POSIX) and the compute unified device architecture (CUDA).

The data file access systems 118 of local memories 115 are configured for storage and retrieval of program instructions for implementing and managing access to files in one or more of storage nodes 150A-p through the NICs 112. A file is typically defined as an arrangement of linked memory locations within a storage structure, such as storage nodes 150. The memory locations may have specific addresses to enable access thereof. The program instructions stored in the data file access systems 118 include instructions and commands for managing and controlling access to a file by more than one process being executed on the processors 111 as part of a distributed software application. The data file access systems 118 can include write lock instructions that can be executed as part of each process running in the processors 110 and requesting access to the file. The write lock instructions may include instructions to remove specific file locks that control access to a file as part of the file system used by the operating system for the compute nodes. The write lock instructions may also include instructions that replace the specific file locks used by the file systems with write lock instructions that implement a group write lock that can be provided to a group of processes collectively requesting access to write data to the file. The write lock instructions may also include instructions to allocate portions of memory in the storage nodes 150 used for the file to one or more of the processing requesting access to the file. The data file access systems 118 also include collective buffering instructions that can be executed in each process that is requesting access to the data file in conjunction with the write lock instructions. The data file access systems 118 further include instructions to execute the write lock instructions without executing some or all of the collective buffering instructions. Examples of data file access systems 118 include MPI-IO and Lustre.

The application and data section 116, process threading system 117, data file access system 118, along with other sections and systems (not shown), configured in local memory 115 make up a distributed computing software stack. An example of a distributed computing software stack is MPI over chameleon (MPICH).

In some examples, computing system 100 comprises an HPC system, such as an HPE Cray EX system, an HPE Apollo system, or other HPC systems. In some examples, computing system 100 comprises a converged or hyperconverged computing system, such as an HPE ConvergedSystem, an HPE SimpliVity system, or other converged/hyperconverged system. In some examples, computing system 100 comprises a collection of individual servers, such as HPE ProLIant servers or other servers. Examples of a compute node 110 include a node of an HPC system, a converged or hyperconverged compute module, an individual server, or other computing device.

The NICs 172 in storage nodes 150 are configured to provide a wired or wireless connection between the storage nodes 150 and the network 140 and may be similar to those examples described for the NICs 112 in compute nodes 110.

The memory controllers 154 in storage nodes 150 are configured to provide an interface for processing data received over the network (through the NIC) to direct the data to specific portions or locations within the storage arrays. Examples of memory controllers include Ultra320 small computer system interface (SCSI), serial attached SCSI (SAS), peripheral component interface express (PCIe) and NVMe.

As noted above, in some examples one or more of the storage nodes 150, such as storage nodes 150A and 150B in FIG. 1, comprise a storage array 156 that comprises storage media of a second, relatively slower, performance class, such as disk-based memory devices. Examples of disk-based memory devices include magnetic hard disk drives and optical disk drives. In addition, in some examples one or more of the storage nodes 150, such as storage node 150p in FIG. 1, comprises a storage array 158 that comprises storage media of a first, relatively faster, performance class, such as solid state device (SSD) memory devices. These SSD memory devices are capable of faster access speeds than disk-based memory devices. It is worth noting that typical access speeds for disk-based memory devices are around 300 megabytes per second (MB/s) while typical access speeds for SSD memory devices are around 4000 MB/s. Examples of storage nodes 150A and 150B include a Cray ClusterStor L300, an HPE Apollo 4000 system with HHDs, an HPE Nimble system with HHDs, or other storage systems. An example of storage node 150p is a Cray ClusterStor E1000, an HPE Apollo 4000 system with SSDs, an HPE 3-PAR system, or other storage systems. Both types of storage arrays 156 and 158 are not necessarily always provided in the same system 100, but in some cases providing both types of storage arrays 156 and 158 can have some benefits. For example, storage arrays 156 may be more cost effective in terms of cost per bit of storage capacity and thus it may be beneficial to use such storage arrays 156 for bulk storage of large amounts of data (e.g., to reduce costs), whereas storage arrays 158, although more costly per bit of storage capacity, may provide faster access speeds and thus it may be beneficial to use such storage arrays 158 for data that is expected to be accessed more frequently and/or for which faster access is desired. By combining the two types of storage arrays 156 and 158 in the same system, costs and performance can be balanced. The number and distribution of such storage arrays 156 and 158 is not limited to any particular arrangement. On the other hand, some systems 100 may utilize just one or the other types of storage array 156 or 158.

As mentioned above, the compute nodes 110 operate as a multi-node parallel processing computer system. In this manner, the execution of the program instructions for distributed software applications may be performed by a plurality of processors 111 on one or more of the compute nodes 110. For example, the distributed software applications may initiate and manage processes executed in the plurality of processors 111 that perform operations associated with operation of the distributed software application through the process threading systems 117. Further, the distributed software applications may establish communication with the storage nodes 150 in order to access files located on the storage arrays 156 and 158 for the purpose of writing and data to the file. The program instructions for this communication may be included as part of the data file access systems 118.

The data file access systems 118 in the compute nodes 110 may be initiated based on instructions from the application and data portions 116 and/or process threading systems 117. Once initiated, one or more of the compute nodes execute program instructions to carry out specific functions associated with requesting access and writing data to a file located on one or more storage nodes 150. These functions are described separately below for ease of understanding, but it should be understood that in practice these may overlap and are not necessarily mutually exclusive. Example operations pertaining to these functions are described below, and some of these are illustrated as flow charts in FIGS. 2-8. The instructions for the data file access system program include instructions that, when executed by a processor, cause the data file access system to perform the operations described below, including, for example, instructions corresponding to the operation shown in FIGS. 2-8.

Further, although the operations below involving accessing files are primarily described with respect to the writing of data to the files, some or all of the operations shown in FIGS. 2-8 may also be applied with respect to the reading from the files.

Figure 2:
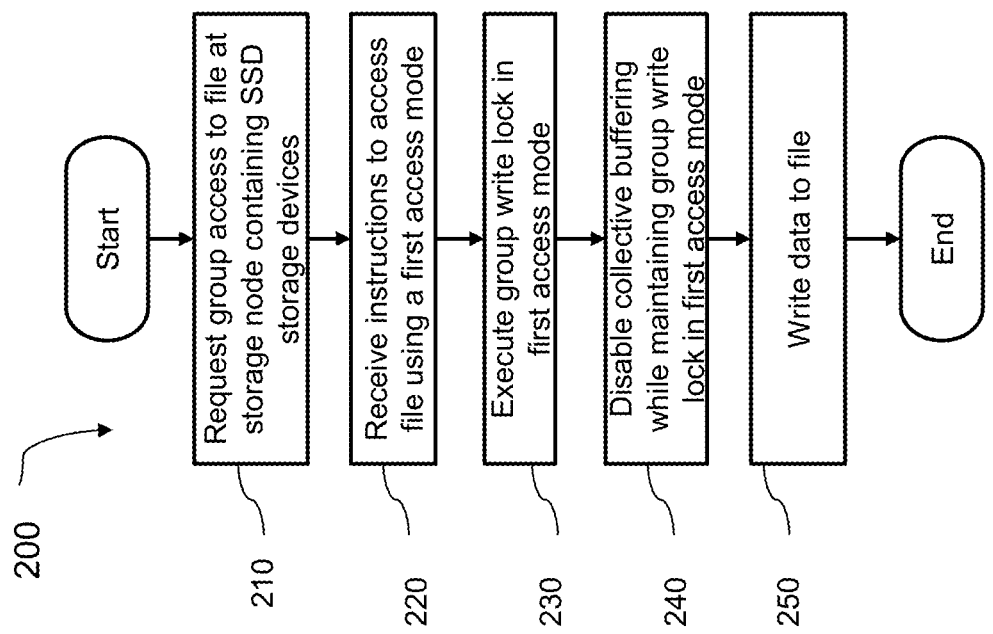
FIG. 2 is a flow diagram illustrating an example method for managing electronic data file access in a distributed computer system.

FIG. 2 is a flow diagram illustrating an example process 200 for managing electronic data file access in a distributed computer system, e.g., system 100. In block 210, group access to a file at a storage node, such as a storage node containing SSD memory devices (e.g., storage node 150p) is requested. Access refers to writing data to or reading data from the file, and group access refers to an access to a file made by a group of processes. The group access is requested by two or more processes being executed by processors 111 included in compute nodes 110. For example, a first process may be running on processor 111A on compute node 110A and a second process may be running on processor 111B on compute node 110B. In some implementations, one process in this group may act as a managing process for the group and the request for group access may be communicated to the managing process from the remaining processes of the group. In other implementations, a separate managing process in one of the processors 111 (i.e., a managing process that is not part of the group of processes) may receive the requests for group access.

In block 220, the two or more processes are instructed, for example by the managing process, to access the file using a first access mode. The first access mode comprises executing a group write lock while also disabling collective buffering, as described in greater detail below in relation to blocks 230 and 240. In some examples, the first access mode is used specifically when accessing a file on a storage node containing SSD memory devices, such as storage array 158 at storage node 150p. The specific instructions for the first access mode may be included as part of the data file access system 118 in local memory 115 of each of compute nodes 110.

As described below, in some examples additional access modes may be available for accessing a file on a storage node. In such examples, as part of block 220, a determination may be made by the managing process to use the first access mode or an additional access mode based on one or more criteria stored in data file access system 118 in local memory 115 of each of compute nodes 110A-n. The criteria may include the type of storage medium being accessed, the size of the data being written or read to the storage node, or other criteria. In other words, in some examples the usage of the first access mode in block 220 may occur in response to a determination that the type of storage medium being accessed is of a defined type (e.g., the first performance class), that the size of the data being written or read satisfies some criterion, or that some other criteria is satisfied, while a different access mode (e.g., a second access mode described below) may be used in other cases. For example, in the context of FIG. 1, in some implementations the first access mode is used whenever the file being accessed is stored one of the storage arrays 158, whereas a different access mode (e.g., second access mode described below in relation to FIG. 3) is used when the file being accessed is stored on one of the storage arrays 156. In other examples, the first access mode could be used regardless of a type of storage medium, including on both storage arrays 156 and storage arrays 158.

In block 230, the specific instructions for a group write lock mechanism are executed by or for the group of two or more processes. In some examples, at least one of the processes of the group, or an external managing process acting for the group, may execute the instructions for a group write lock mechanism, which causes the process(es) executing the instructions to send a request to the file management system to disable its normal locking mechanism in relation to the group of processes and as to the file that the group is accessing. As noted above, the conventional locking mechanism of the file management system may prevent multiple processes from simultaneously accessing a file. In some examples, all of the processes of the group may individually send a request to the file management system for the group write lock. In other examples, one process (e.g., a managing process) may send a single request to the file management system on behalf of all the processes in the group. Each of the processes that participates in the group write lock mechanism will be assigned a specific and unique memory allocation in the file being accessed. In some examples, the assignment of the memory allocations may be made by a managing process. In other examples, each process may have a predetermined assignment of a memory location. For example, the processes may have a predetermined rank ordering and each may be configured to utilize a memory allocation defined according to their rank ordering (e.g., a first process takes a first memory location, a second process takes a second memory location at a predefined offset from the first memory location, a third process takes a third memory location at a predefined offset form the second memory location, and so on). The allocations may be determined in any way based on any criteria (including randomly), as long as they do not overlap with one another. The allocation of blocks of memory to each of the processes in conjunction with a group write lock, such as implemented by the write lock mechanism described herein, ensures consistency with respect to the overwriting of memory locations as a result of access by more than one process. In other words, because memory locations are allocated among the group of processes executing the group write lock in a non-overlapping manner, the processes can access the file concurrently without risk of overwriting one another's data, and this is why it is safe to disable the normal file locking of the file system which is intended to prevent such overwriting.

In block 240 specific instructions to disable the collective buffering mechanism are executed by each of the two or more processes. The instructions to disable collective buffering mechanism may include instructions to allow each of the two or more processes to access the file for writing its own data to the respective block of memory assigned to each process through the write lock mechanism in block 230. As described above, in prior systems generally collective buffering is automatically utilized whenever group write lock is engaged, and thus the disabling of collective buffering mechanism in block 240, in conjunction with the engagement of the group write lock in block 230, alters the usual behavior of the system when it comes to using group write locks. As noted above, collective buffering causes, in some circumstances, a performance bottleneck due to added processing overhead needed for the collective buffering. Thus, by disabling collective buffering in some circumstances, performance can be increased.

In block 250, each of the two or more processes instruct the NICs 112 in the compute nodes 110 to access the file and write the data at specified memory locations on storage array 158 at storage node 150*p*. The specified memory locations are those assigned in accordance with the group wrote lock mechanism as described above in relation to block 230. Thus, for example, the first process writes data to a first memory location, the second process writes data to a second memory location, and so on. It is worth noting that each of the processes may communicate and write data during the same period of time without risk of writing data to overlapping memory locations due to the operations carried out as part of the first access mode as described above.

Figure 3:
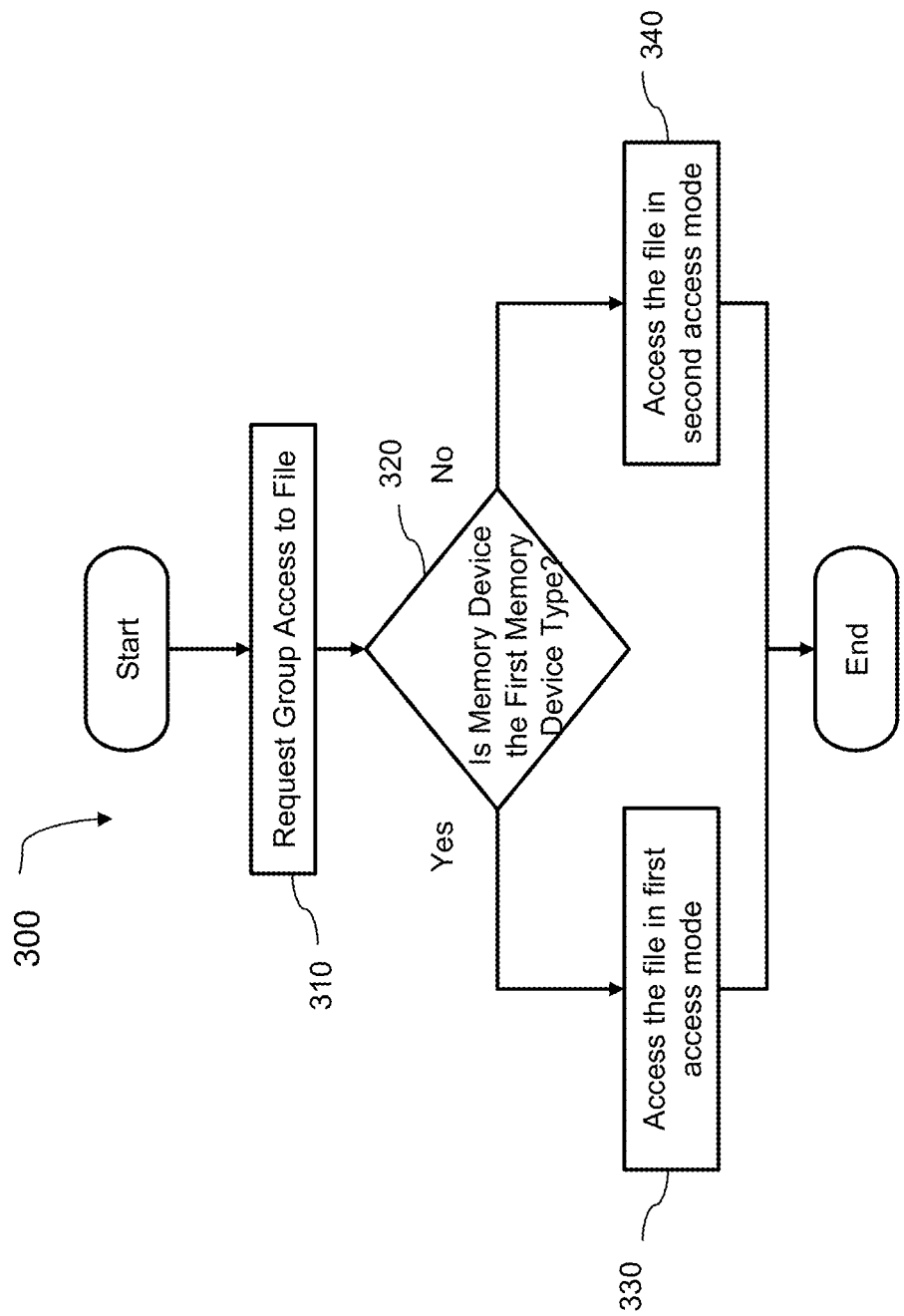
FIG. 3 is a flow diagram illustrating another example method for managing electronic data file access in a distributed computer system.

FIG. 3 describes an example method 300 for managing electronic data file access in a distributed computer system that includes the ability to utilize multiple access modes to manage file access when more than one memory device type is available at the storage nodes 150. In block 310, group access to a file contained on one of the storage nodes 150 is requested by a set of processes running in the compute nodes 110. The set of processes may include at least two processes that are running on different one of compute nodes 110. The requests may be made using software instructions included in the data file access system 118 described above.

In block 320, a determination is made, for example by the managing process, as to the type of a memory device that is being used to store the file. The determination may be made based on identification information of the memory devices and based on a comparison of that identification information to a selection from a list that correlates various predetermined memory devices with memory device types. The determination may alternatively be made based on one or more performance characteristics for the memory device used in the storage node that contains the file, with the devices being identified as different types based on their performance characteristics (e.g., faster devices may be identified as a first type of device while slower devices may be considered as a second type of device). In some examples, the type of memory device is selected from two predetermined types: a first type corresponding to a first performance class and the second type corresponding to a second performance class, wherein the first type is faster than the second performance type. For example, in some implementations the second type of memory device includes disk-based memory devices used for memory devices in storage arrays 156, such as magnetic hard disk drives and optical disk drives, and the first type of memory device includes SSD memory devices used for memory devices in storage array 158, such as solid-state memory drives and persistent memory drives. In other implementations flash based SSDs may be part of the second type (along with slower disk-based memory devices), while the first type may comprise NVRAM or other persistent memory faster than flash-based SSDs. In some implementations, the types of memory devices are defined by numerical ranges of performance characteristics rather than by product classes.

In some examples, some aspects of the above-described determination in block 320 may be performed at different times, and some aspects are not necessarily repeated for each request to access a file. For example, in some implementations operations related to gathering information from or about the memory devices (e.g., performing measurements, discovering identifying information, etc.) and comparing that information to a list or to ranges to determine a type of the memory device may be performed once (e.g., during start up, upon a first group access, or at some other convenient time), and thereafter these operations are not repeated each time the file is accessed. Instead, in some examples, the system may keep a record of the types of the various memory devices once it has made such identifications, and thereafter the determination of block 320 may be made by consulting this record.

In block 330, if the type of memory device is a first type of memory device, then each one of the set of processes accesses the file in a first access mode. For example, if the first type of memory device is an SSD memory device, the first access mode comprises executing program instructions for accessing the file on an SSD memory device. The program instructions may be similar to those instructions described above in FIG. 2, namely implementing a write lock mechanism and disabling collective buffering for each of the two or more processes.

In block 340, if the type of memory device is a second type of memory device, then each one of the set of processes accesses the file in a second access mode. For example, if the second type of memory device is a disk-based memory device, the second access mode comprises program instructions for accessing the file on a disk-based memory device. The program instructions may include instructions for each of the two or more processes to execute a write lock mechanism similar to the instructions described above in block 230. The program instructions may further include instructions for each of the two or more processes to implement and enable a collective buffering mechanism. As described earlier, the use of collective buffering includes additional processing operations and overhead in the compute nodes 110 to reduce the number of processes that have to access the storage nodes 150 when writing data to the file. As a result, collective buffering is more suited for use with types of memory devices that have slower access speeds, such as disk-based memory devices.

In some implementations, the determination, in block 320, may be carried out in a process separate from the group of two or more processes requesting access to the file, such as the separate managing process described above or some other process which may be running on one of the compute nodes 110. In some examples, the process that makes the determination in block 320 also determines which access mode the group of processes should use, based on the determined type of memory device, and this process instructs the group of processes which mode to use. In other examples, the process that makes the determination in block 320 does not determine which access mode the group of processes should use, and instead merely conveys the determined type of memory device to the group of processors. In this case, the group of processes may determine for themselves what access mode to use based on the received information—for example, a managing process of the group of processes may determine which mode to use, or each process may make the determination individually (each process may comprise the same logic for making this determination, and thus they may all come to the same conclusion despite doing so separately).

In some other implementations, the determination, in block 320, may be carried out in one of the group of two or more processes in the compute nodes requesting access to the file. For example, a managing process of the group may make the determination in block 320. In some examples, the process that makes the determination in block 320 also determines which access mode the group of processes should use, based on the determined type of memory device, and this process instructs the group of processes which mode to use. In other examples, the process that makes the determination in block 320 does not determine which access mode the group of processes should use, and instead merely conveys the determined type of memory device to the other processes of the group. In this case, the processes of the group may determine for themselves what access mode to use based on the received information (each process may comprise the same logic for making this determination, and thus they may all come to the same conclusion despite doing so separately). In still other implementations, the determination, in block 320, may be carried out in each process of the group of two or more processes in the compute nodes. In other words, each process determines for itself the type of memory device being accessed and which one of the first access mode and the second access mode to use based on the determination (in such implementations, the processes are each programed with the same logic for making these determinations and thus will all come to the same conclusions, despite doing so independently).

Thus, the method 300 allows for two different access modes to be used based on the type of the storage media being accessed, with the first access mode being used when the storage media is a first type and the second access mode being used when the storage media is a second type.

Figure 4:
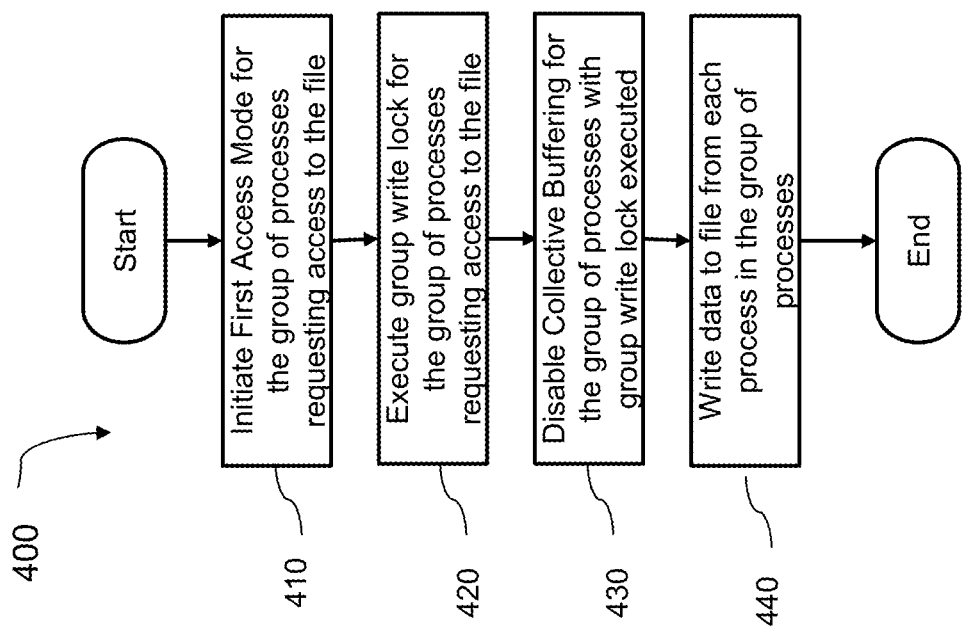
FIG. 4 is a flow diagram illustrating an example method for accessing a file in a first access mode in a distributed computer system.

Turning now to FIG. 4, an additional method 400 will be described. In some implementations, program instructions for implementing the operations described as part of process 400 in FIG. 4 may be used as part of accessing the file in a first access mode described above in block 330. For example, method 400 may be used to cause the compute nodes (e.g., all or a subset of compute nodes 110) that include a group of processes that requested group access to a file to access the file using the first access mode. The method 400 may comprise executing various instructions (or causing execution of such instructions) by one or more of the compute nodes 110. As described above in relation to the method 300, in some cases a single process may execute the instructions, such as a managing process (which may be part of the group of processes performing the group write, or which may be separate therefrom), while in other cases all instructions may be executed in a parallel and/or distributed fashion by multiple processes (e.g., each of the processes in the group that is doing the group write).

In block 410, instructions are executed to initiate the first access mode. For example, the instructions may include identifying the type of memory device as a first memory device type and initiating a process in the compute node that includes the instructions for the first access mode in response to identifying the type of memory device as a first memory device type.

In block 420, instructions are executed for implementing a write lock mechanism on each process in the group of processes. For example, instructions may be included for allocating separate blocks of memory for each of the processes as well as preventing each of the processes from writing data to the memory device outside of their allocated block of memory. Block 420 may be performed in response to the initiation of the first access mode in block 410. In other words, in some examples the first access mode comprises block 420.

In block 430, instructions are executed for disabling the use of the collective buffering mechanism on each process in the group of processes. For example, instructions may be included that allow each process in the group of processes to write data to their respective block of memory allocated by the write lock mechanism in block 420. In some implementations, instructions may be included that cause a file system in the compute nodes 110 to view each of the processes in the group of processes as if it were an aggregator as part of the collective buffering mechanism, even though the collective bargaining mechanism is disabled and each of the processes is configured to access file directly. Block 430 may be performed in response to the initiation of the first access mode in block 410. In other words, in some examples the first access mode comprises block 430.

In some examples, the first access mode, and hence the disabling of collective buffering mechanism that is part of the first access mode, is used when the target storage medium for a group write is a relatively fast storage medium, such as an SSD. As described above, with fast storage media, the time it takes to access the media has become low enough that the processing overhead associated with the collective buffering is now a more significant bottleneck than the accessing of the storage media, and thus the collective buffering now becomes a net negative in terms of overall system performance. Thus, disabling collective buffering in these circumstances may result in faster system performance.

In block 440, instructions are executed that cause each of the processes in the group of processes to write data from the process to the file in a state of the write lock mechanism being active and the collective buffering being disabled, in a manner similar to that described above in block 250.

Figure 5:
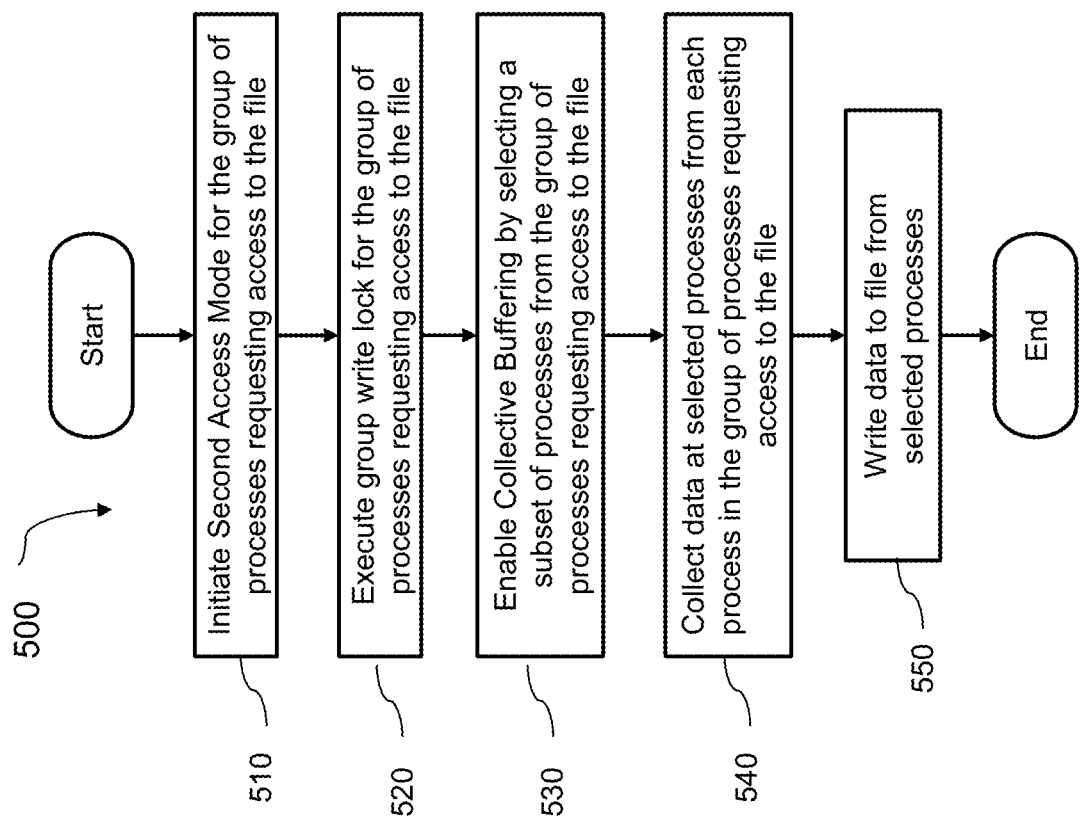
FIG. 5 is a flow diagram illustrating an example method for accessing a file in a first access mode in a distributed computer system.

In some implementations, program instructions for implementing the operations described as part of method 500 in FIG. 5 may be used as part of accessing the file in a second access mode described above in block 340. In block 510, instructions are executed to initiate the first access mode. For example, the instructions may include identifying the type of memory device as a first memory device type in order to initiate a process in the compute node that includes the instructions for the second access mode.

In block 520, instructions are executed for implementing a write lock mechanism on each process in the group of processes. For example, instructions may be included for allocating separate blocks of memory as well as preventing writing data outside of the allocated block of memory as described in block 420. Block 520 may be performed in response to the initiation of the second access mode in block 510. In other words, in some examples the second access mode comprises block 520.

In block 530, instructions are executed for enabling the use of the collective buffering mechanism on each process in the group of processes by selecting a subset of processes that will be used to collect data prior to accessing the file, which as described above corresponds to each process in that subset being selected as an aggregator. Block 530 may be performed in response to the initiation of the second access mode in block 510. In other words, in some examples the second access mode comprises block 530.

In some examples, the second access mode, and hence the collective buffering mechanism, is used when the target storage medium is a relatively slow storage medium, such as a disk-based device. As described above, collective buffering works relatively well with such devices and can help to alleviate bottlenecks that might otherwise occur when multiple processes attempt to concurrently access such relatively slow media. In particular, in such cases collective buffering results in time saving for accessing (e.g., writing to or reading from) the media and this time saving may outweigh the increased processing overhead incurred by the collective buffering.

In block 540, instructions are executed that cause the one or more of the selected processes to request and collect the data that is to be written to the file from each process in the group of processes. In some implementations each of the one or more selected processes may request and collect data from specific processes in the group of processes. In some implementations, each of the one or more selected processes may request and collect data from all of the processes in the group of processes.

In block 550, instructions are executed that cause one or more of the selected processes to write the data, including the collected data, from the one or more selected processes to the file in a manner as described above in FIG. 2. In some implementations, the one or more selected processes may receive information about the allocated memory block from each of the processes in order to use these allocated memory blocks to write the data, including the collected data, to the file. For example, if a selected process has a memory block allocated from 00ffh to 0ffeh and collects data from two processes in the group of processes having allocated blocks of memory from 0ffh to 1000h and 1001h to 1fffh respectively, then the selected process can write all of the date to the file between memory locations 00ffh and 1fffh. In some implementations, the one or more selected processes may be allocated a separate block of memory for the collected data as part of the collective buffering mechanism, the separate block of memory being large enough to store all the data.

Figure 6:
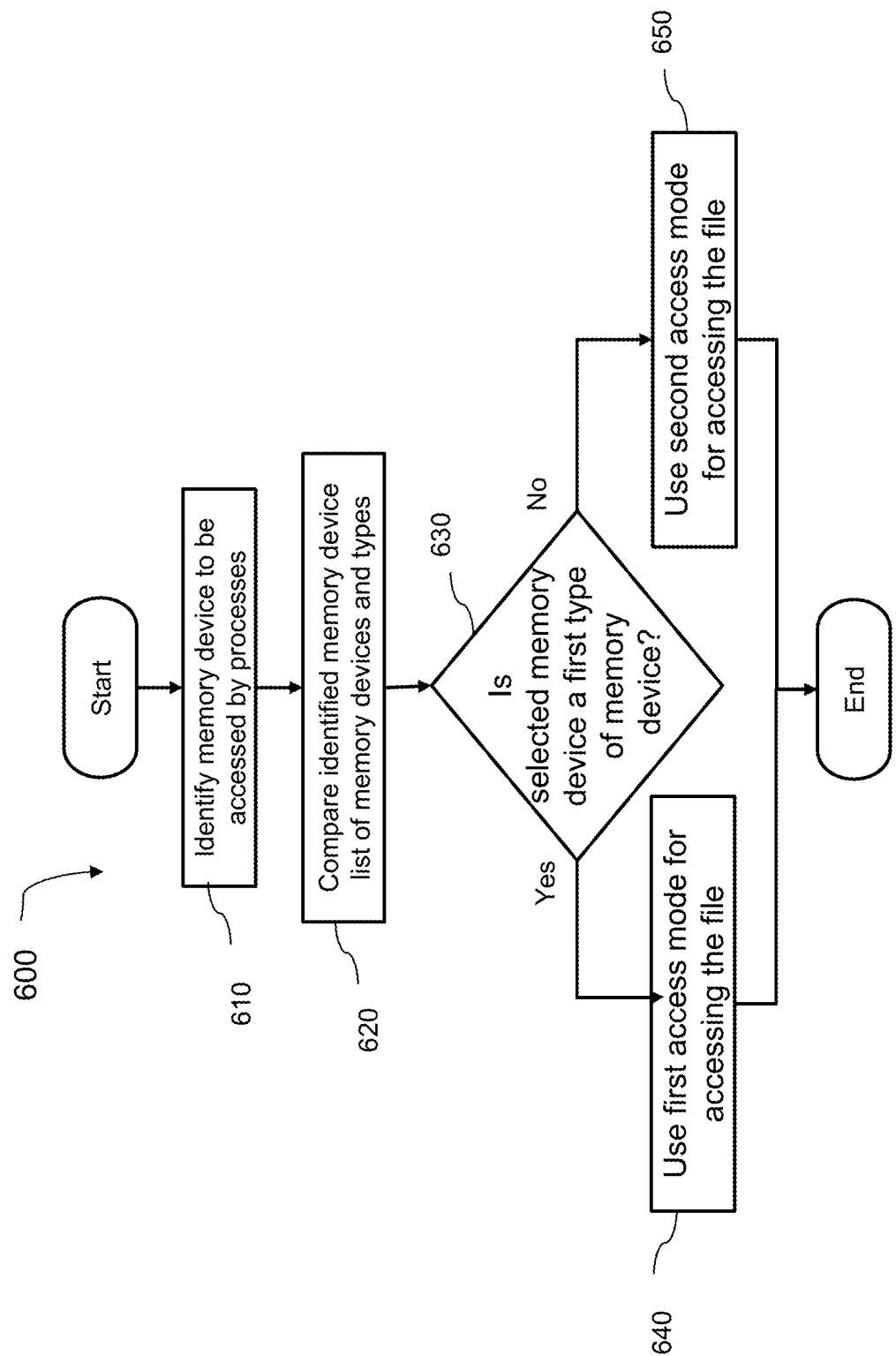
FIG. 6 is a flow diagram illustrating an example method for determining a type of memory device in a distributed computer system.

In some implementations, program instructions for implementing the operations described as part of method 600 in FIG. 6 may be used as part of determining the type of memory device described above in block 320. In block 610, the memory device to be accessed by the processes requesting access to a file is identified. For example, identification information of the memory device, such as a product name, an SKU number, a device type or class identifier, or other identifying information, may be read from the memory device or from some other component (such as a baseboard management controller or system controller). The identification of the memory device may be communicated from one of the processes requesting access to the other processes in the compute nodes 111. Alternatively, the identification of the memory device may be provided to the compute nodes 111 by the storage node 150 at which the file is located.

In block 620, the identification information for the memory device is compared to a list that correlates identification information of memory devices with memory device types. The list of memory devices and types may be preprogramed and/or user configurable. For example, in some implementations the list may be created by a manufacturer or developer specifying various known memory devices and categorizing them as the first type or second type. In some examples in which the list is user configurable, a user may specify additional memory devices or change a categorization of an existing device in the list. In examples in which the list is user configurable, the list may be provided to a user or programmer as part of a user interface mechanism as part of the set-up of a distributed software application in the computer system 100. Alternatively, in examples in which the list is user configurable, the list of devices and types may be stored in local memory 115 and provided to a user or a programmer or programmer as part of the operation of the distributed software application in computer system 100. In other examples, the list is not provided to a user and is not user configurable. In some examples, the list may comprise identifying information of memory devices of both the first type and the second type, together with an indication of the corresponding type. In other examples, the list may comprise identifying information of only memory devices of one type (e.g., the first type), and it may be implicitly determined that the memory device is of that type if it is found in the list and of the other type if not found in the list.

In block 630 a determination is made as to whether the memory device selected, in block 620 is a first type of memory device based on the comparison, in block 620. If in block 630, the selected memory device is a first type of memory device, then, in block 640, control commands are provided to any processes requesting access to a file on the selected memory device to use the first access mode, such as is described in block 330 in FIG. 3. If, in block 630, the selected memory device is not a first type of memory device, then, in block 650, control commands are provided to any processes requesting access to a file on the selected memory device to use the second access mode, such as is described in block 340 in FIG. 3.

Figure 7:
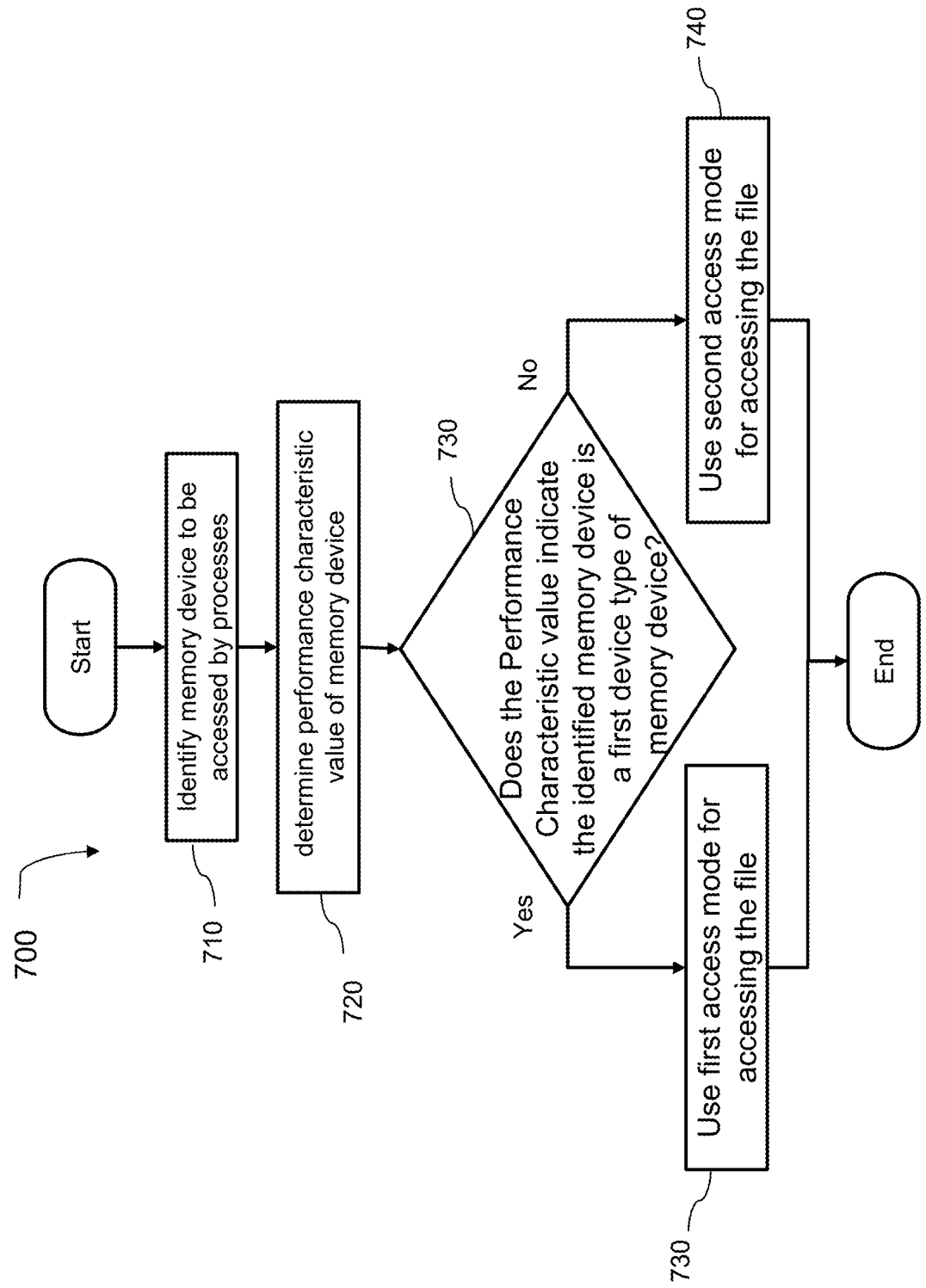
FIG. 7 is a flow diagram illustrating another example method for determining a type of memory device in a distributed computer system.

In some implementations, program instructions for implementing the operations described as part of method 700 in FIG. 7 may be used as part of determining the type of memory device described above in block 320. In block 710, the memory device to be accessed by the processes requesting access to a file is identified. The identification of the memory device may be communicated from one of the processes requesting access to the other processes in the compute nodes 111. Alternatively, the identification of the memory device may be provided to the compute nodes 111 by the storage node 150 at which the file is located.

In block 720, a value for a performance characteristic associated with the identified memory device is determined. In some examples, determining the performance characteristic may include the system 100 performing a measurement of the characteristic. In some implementations, the value for the performance characteristic may be determined as part of a self-test process implemented by the storage nodes 150 or as result of a request to the storage nodes 150 from the compute nodes 110 to run a test for the performance characteristic and provide the value from the test. An example of a performance characteristic is access speed wherein the performance characteristic is access time. In other examples, the performance characteristic may be self-reported by the storage nodes to the compute nodes.

In block 730 a determination is made as to whether the value for the performance characteristic indicates that the identified memory device is a first type of memory device. The determination may be made by comparing the value determined for the performance characteristic of the identified memory device to a value or range of values for that performance characteristics for each of the different types of memory devices available. For example, in some implementations the range of values for a first type of memory device, such as an SSD memory device, is 4,000 MB/s or greater for random writes and the range of values for a second type of memory device, such as a disk based memory device, is less than 270 MB/s for random writes. In such an example, if the value for access speed of the identified memory device is hypothetically measured as 15,000 MB/s, then the value for access speed from the identified memory device would indicate that it is a first type of memory device. Other performance characteristics and/or ranges may be used to define the first type and second type.

If, in block 730, the value for the performance characteristic indicates that the identified memory device is a first type of memory device, then, in block 740, control commands are provided to any processes requesting access to a file on the selected memory device to use the first access mode, such as is described in block 330 in FIG. 3. If in block 730 if the value for the performance characteristic indicates that the identified memory device is not a first type of memory device, then, in block 750, control commands are provided to any processes requesting access to a file on the selected memory device to use the second access mode, such as is described in block 340 in FIG. 3.

Figure 8:
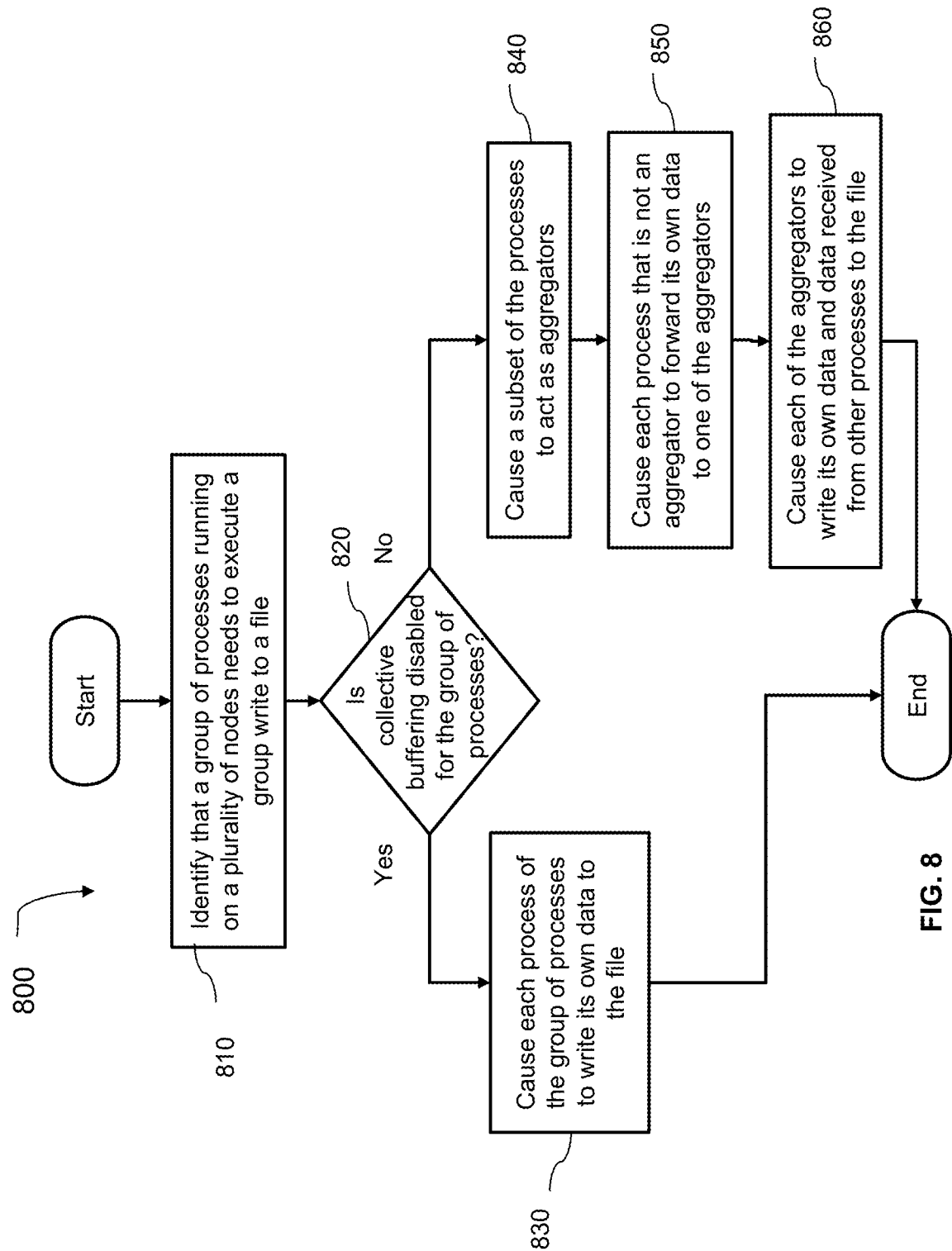
FIG. 8 is a flow diagram illustrating a further example method for managing electronic data file access in a distributed computer system.

FIG. 8 describes an example method 800 for managing electronic data file access in a distributed computer system that includes the ability to manage file access when more than one memory device type is available at the storage nodes 150.

In block 810 a process that is being used to manage access to files on the storage nodes 150 identifies that a group of processes running on a plurality of nodes needs to execute a group write to a file. The process that is being used to manage access may be one of the processes in the group or processes or may be a separate process from the group of processes as described above.

In block 820, the process being used to manage access determines whether collective buffering has been disabled for the group of processes. Collective buffering may be enabled or disabled based on the type of memory devices that are being used by one or more of the storage nodes 150, as described earlier. If collective buffering has been disabled, then in block 830, the process being used to manage access causes each process of the group of processes to write its own data to the file. In some implementations, the process being used to manage access may cause each process of the group of processes to act as an aggregator without collecting data from any other processes, as described above.

If, in block 820, collective buffering has not been disabled, then, in block 840, the process being used to manage access causes a subset of the processes to act as aggregators. In block 850, the process being used to manage access further causes each process that is not an aggregator to forward its own data to one of the aggregators. In block 860, the process being used to manage access additionally causes each of the aggregators to instruct their respective NICs 112 in compute nodes 110 to write its own data and data received from the other processes to the file.

Figure 9:
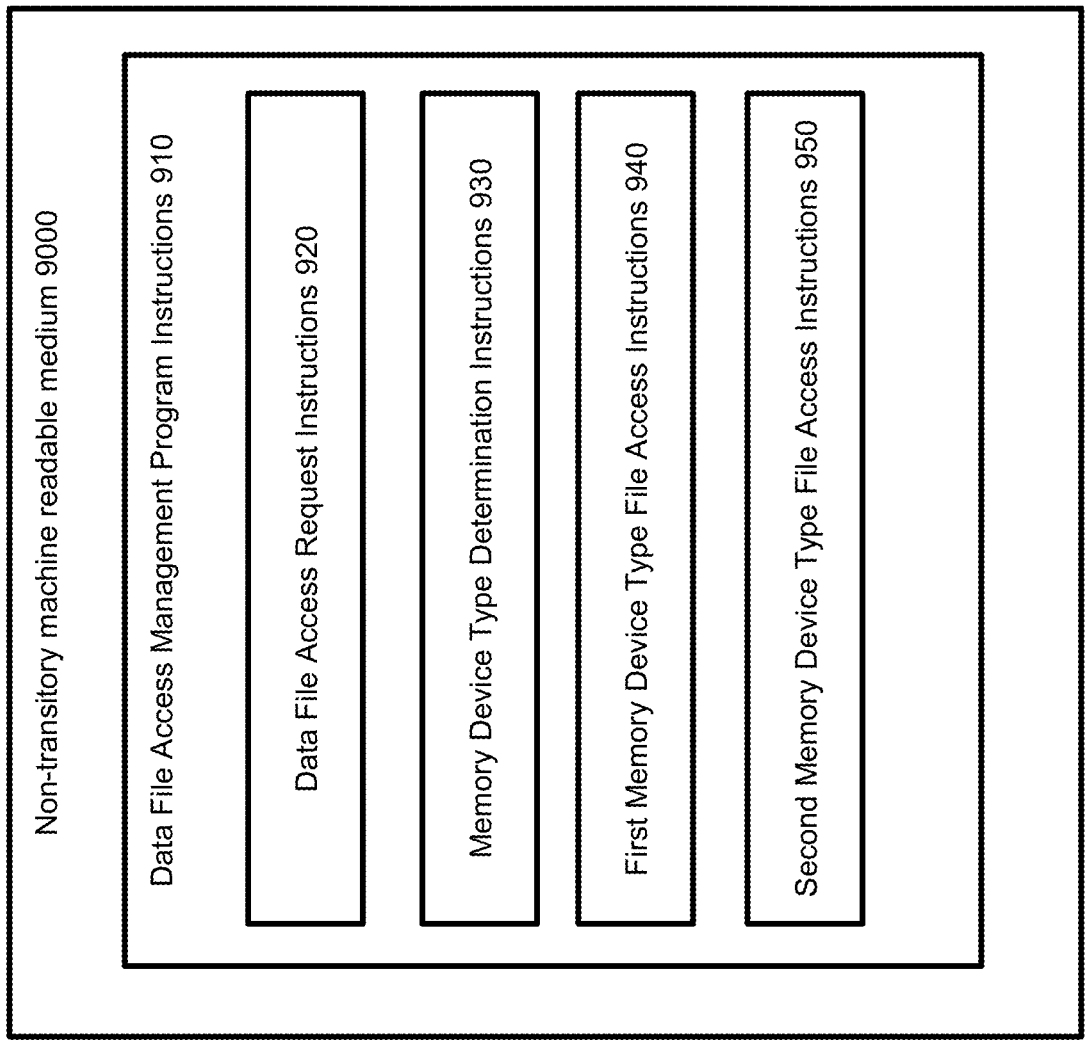
FIG. 9 illustrates an example non-transitory machine readable medium storing example data file access management instructions.

FIG. 9 illustrates example processor executable instructions stored on a non-transitory machine readable medium 9000. In particular, the data file access management instructions 910 associated with the data file access system 118 in compute nodes 110 are stored on the medium 9000.

The data file access management instructions 910 may include instructions that, when executed, instantiate the data file access system 118 in compute nodes 110. In particular, the data file access management instructions 910 may include instructions to perform any or all of the operations that were described above as being performed by the compute nodes 110, including for example, any of the example operations illustrated in FIGS. 2-8.

For example, the data file access management instructions 910 may include data file access request instructions 920, memory device type determination instructions 930, first memory device type instructions 940, and second memory device type instruction 950 in order to perform one or both of the operations of FIG. 3 and FIG. 8. The memory device type determination instructions 930 may include instructions to perform one or both of the operations in FIG. 6 and FIG. 7. The first memory device type file access instructions 940 may include instructions to perform one or both of the operations in FIG. 2 and FIG. 4. The second memory device type file access instructions 950 may include instructions to perform the operations in FIG. 5.

For example, the memory device type determination instructions 930 may include instructions to identify the memory device to be accessed by the processes requesting access to a file, compare the identified memory device to a list of memory devices and types, determine if the selected memory device is a first type of memory device, and provide instructions to use either the first access mode or the second access mode depending on the determination as described in FIG. 6. The memory device type determination instructions 930 may include instructions to identify the memory device to be accessed by the processes requesting access to a file, determine a value for a performance characteristic of the identified memory device, determine if the value for the performance characteristic indicates the memory device is a first type of memory device, and provide instructions to use either the first access mode or the second access mode depending on the determination as described in FIG. 7.

For example, the first memory device type file access instructions 940 may include instructions to implement a write lock and disable collective buffering on each process as well as write the data from each process to a file as described above in FIG. 4.

For example, the second memory device type file access instructions 950 may include instructions to implement a write lock and enable collective buffering on each process as described above in FIG. 5. The second memory device type file access instructions 950 may also include instructions to select a subset of the processes to act as aggregators that collect data from the processes and write the collected data to a file as described above in FIGS. 5 and 8.

Figure 10:
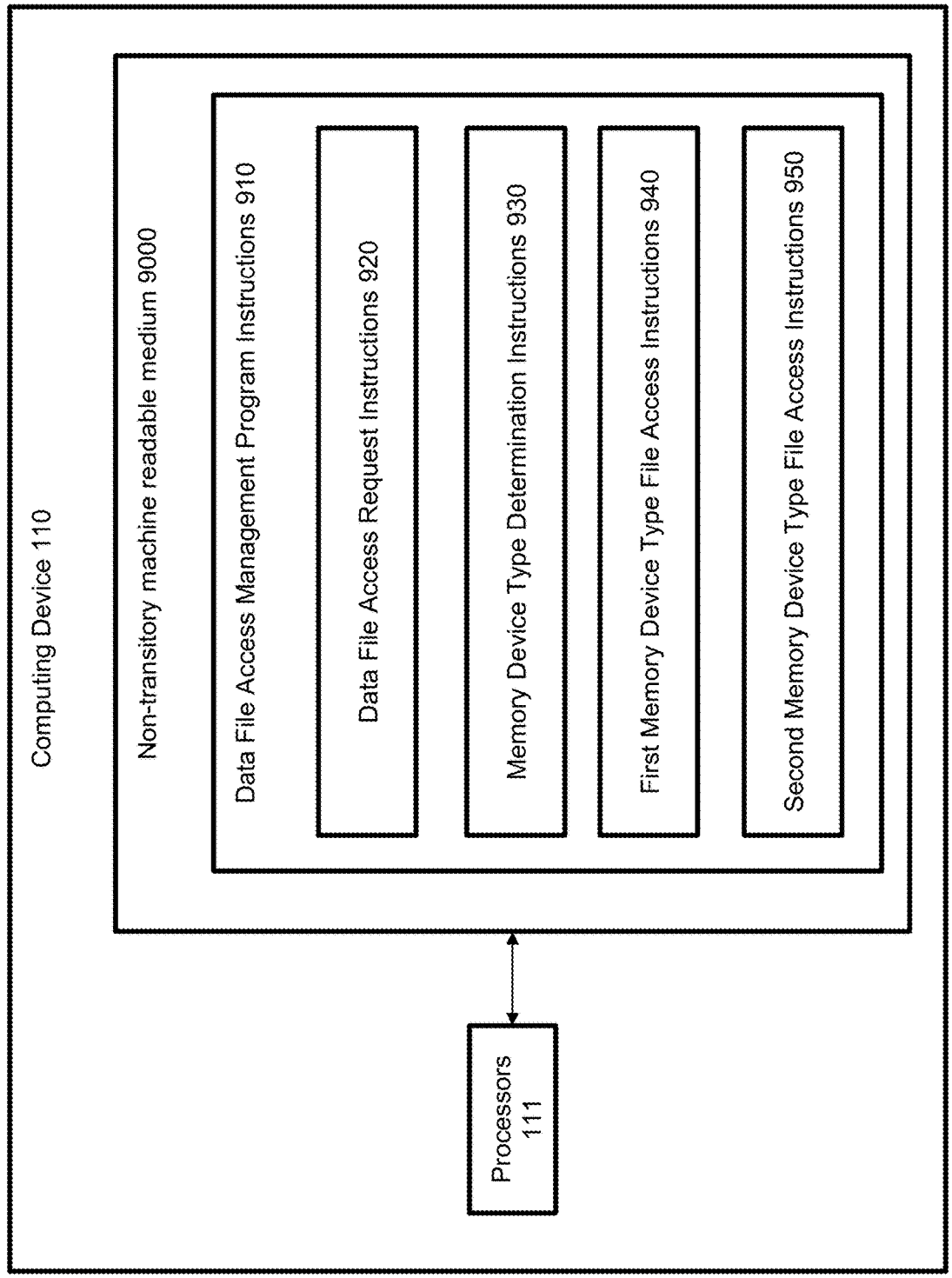
FIG. 10 illustrates an example compute node that includes a non-transitory machine readable medium storing example data file access management instructions.

FIG. 10 illustrates example computing device 110 that is configured to read instructions stored on a non-transitory machine readable medium 9000. The non-transitory machine readable medium 9000 may be included as part of local memory 115. In particular, one or more of the processors 111 in computing device 110 is configured to read and execute some or all of the data file access management instructions 910 stored on the non-transitory machine readable medium 9000 in order to perform any or all of the operations that were described above, including for example, any of the example operations illustrated in FIGS. 2-8.

For example, the processors 111 may be configured to read and execute the data file access request instructions 920, memory device type determination instructions 930, first memory device type instructions 940, and second memory device type instruction 950 in order to perform one or both of the operations of FIG. 3 and FIG. 8. The processors 111 may additionally be configured to read and execute some or all of the determination instructions 930 in order to perform one or both of the operations in FIG. 6 and FIG. 7. The processors 111 may further be configured to read and execute some or all of the first memory device type file access instructions 940 in order to perform one or both of the operations in FIG. 2 and FIG. 4. The processors 111 may also be configured to read and execute some or all of the second memory device type file access instructions 950 in order to perform the operations in FIG. 5.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry. In some cases, certain electronic circuitry may comprise processing circuitry. Processor or processing circuitry comprises circuitry configured with logic for performing the various operations. The logic of the processing circuitry may comprise dedicated hardware to perform various operations, software (machine readable and/or processor executable instructions) to perform various operations, or any combination thereof. In examples in which the logic comprises software, the processing circuitry may include a processor to execute the software instructions and a memory device that stores the software. The processor may comprise one or more processing devices capable of executing machine readable instructions, such as, for example, a processor, a processor core, a central processing unit (CPU), a controller, a microcontroller, a system-on-chip (SoC), a digital signal processor (DSP), a graphics processing unit (GPU), etc. In cases in which the processing circuitry includes dedicated hardware, in addition to or in lieu of the processor, the dedicated hardware may include any electronic device that is configured to perform specific operations, such as an Application Specific Integrated Circuit (ASIC), a Field Programmable Gate Array (FPGA), a Complex Programmable Logic Device (CPLD), discrete logic circuits, a hardware accelerator, a hardware encoder, etc. The processing circuitry may also include any combination of dedicated hardware and processor plus software.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a," "an," and "the" are intended to include the plural forms as well, unless the context indicates otherwise. Moreover, the terms "comprises," "comprising," "includes," and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Provide: As used herein, to "provide" an item means to have possession of and/or control over the item. This may include, for example, forming (or assembling) some or all of the item from its constituent materials and/or, obtaining possession of and/or control over an already-formed item.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of $\{A\}, \{B\}, \{C\}, \{A, B\}, \{A, C\}, \{C, B\}$, and $\{A, C, B\}$."

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the implementations disclosed herein. It is intended that the specification and examples be considered as exemplary only, with the following claims being entitled to their fullest breadth, including equivalents, under the applicable law.

What is claimed is:

1. A system comprising:
   at least one storage node coupled to a network, the storage node configured in a parallel distributed file system and including at least one type of memory device;
   a plurality of compute nodes coupled to the network, each one of the plurality of compute nodes including at least one processor, the plurality of compute nodes configured to request group access to a file in the parallel distributed file system, the request being made by at least two processes, each one of the at least two processes running on a different one of the plurality of compute nodes in the network;
   wherein, at least one compute node of the plurality of compute nodes is configured to:
      determine the type of a memory device that includes the file;
      cause the plurality of compute nodes to collectively access the file in a first access mode if it is determined that the memory device is a first type, the first access mode comprising applying a write lock mechanism and disabling a collective buffering mechanism to each of the different ones of the compute nodes; and
      access the file in a second access mode if it is determined that the memory device is a second type, the second access mode comprising applying the write lock mechanism and enabling a collective buffering mechanism to each of the different ones of the compute nodes.

2. The system of claim 1, wherein determining the type of memory device further includes selecting the type of memory device from a list of types of memory devices.

3. The system of claim 1, wherein determining the type of memory device further including determining a performance characteristic of the memory device.

4. The system of claim 3, wherein the performance characteristic is access speed.

5. The system of claim 1, wherein the type of memory device includes at least one of solid state memory device and magnetic hard disk drive.

6. The system of claim 1, wherein enabling the collective buffering mechanism further includes selecting a subset of the at least two processes comprising at least one process as an aggregator, the aggregator collecting data from at least one other process of the at least two processes and writing the data to file, and wherein disabling the collective buffering mechanism further includes each process writing its own data to the file.

7. The system of claim 1, wherein disabling the collective buffering includes causing the file system to view each process as if it were an aggregator, except that the processes do not collect data from any other processes.

8. The system of claim 1, wherein the at least two processes are part of a software application running on the plurality of compute nodes to perform a task.

9. The system of claim 1, wherein the first access mode and the second access mode are included in message passing interface over chameleon (MPICH) software.

10. The system of claim 1, wherein the at least one compute node determining the type of memory device comprises one compute node of the plurality of compute nodes determining the type of memory device and instructing the other compute nodes of the plurality of compute nodes as to which one of the first access mode and the second access mode to use based on the determined type of memory device.

11. The system of claim 1, wherein the at least one compute node determining the type of memory device comprises each compute node of the plurality of compute nodes determining the type of memory device and determining which one of the first access mode and the second access mode to use based on the determined type of memory device.

12. A non-transitory machine readable medium storing an operating image comprising instructions file access management instructions that, when executed by at least one processor in a compute node, causes the node to instantiate a data file access system that is to:
   in response to a request for group access to a file in parallel distributed file system made by at least two processes:
      determine the type of a memory device that includes the file;
      cause the plurality of compute nodes to collectively access the file in a first access mode if it is determined that the memory device is a first type, the first access mode comprising applying a write lock mechanism and disabling a collective buffering mechanism to each of the different ones of the compute nodes; and
      access the file in a second access mode if it is determined that the memory device is a second type, the second access mode comprising applying the write lock mechanism and enabling a collective buffering mechanism to each of the different ones of the compute nodes.

13. The non-transitory machine readable medium of claim 12, wherein determining the type of memory device further includes selecting the type of memory device from a list of types of memory devices.

14. The non-transitory machine readable medium of claim 12, wherein determining the type of memory device further includes determining a performance characteristic of the memory device.

15. The non-transitory machine readable medium of claim 12, wherein enabling the collective buffering mechanism further includes selecting a subset of the at least two processes comprising at least one process as an aggregator, the aggregator collecting data from at least one other process of the at least two processes and writing the data to file, and wherein disabling the collective buffering mechanism further includes each process writing its own data to the file.

16. The non-transitory machine readable medium of claim 12, wherein disabling the collective buffering includes causing the file system to view each process as if it were an aggregator, except that the processes do not collect data from any other processes.

17. A method comprising:
requesting group access to a file located on a first type of memory device in a parallel distributed file system, the request being made by at least two processes, each one of the at least two processes running on a different one of a plurality of compute nodes in a network; and
accessing the file in a first access mode, the first access mode associated with the first type of memory device, the first access mode comprising applying a write lock mechanism and disabling a collective buffering mechanism to each of the different ones of the compute nodes.

18. The method of claim 17, wherein disabling the collective buffering includes causing a file system in each of the different one of the compute nodes to view each process as if it were an aggregator, except that the processes do not collect data from any other processes.

19. The method of claim 17, wherein the first type of memory device is a solid state memory device.

20. The method of claim 17, wherein the at least two processes are part of a software application running on the plurality of compute nodes to perform a task.

* * * * *